US012683908B2

(12) United States Patent
Friedman et al.

(10) Patent No.: US 12,683,908 B2
(45) Date of Patent: Jul. 14, 2026

(54) PACKET GENERATION METHODS AND DEVICES FOR ORDERED DATA OFFLOADS

(71) Applicant: MELLANOX TECHNOLOGIES, LTD., Yokneam (IL)

(72) Inventors: Yamin Friedman, Jerusalem (IL); Idan Burstein, Carmiel (IL); Ariel Shahar, Jerusalem (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/757,880

(22) Filed: Jun. 28, 2024

(65) Prior Publication Data

US 2026/0005980 A1     Jan. 1, 2026

(51) Int. Cl.
*H04L 47/36*          (2022.01)
*H04L 47/62*          (2022.01)
*H04L 47/628*         (2022.01)

(52) U.S. Cl.
CPC ........ *H04L 47/6235* (2013.01); *H04L 47/365* (2013.01); *H04L 47/628* (2013.01); *H04L 47/36* (2013.01)

(58) Field of Classification Search
CPC ....... H04L 47/36; H04L 47/365; H04L 47/50; H04L 47/522; H04L 47/6235; H04L 47/622; H04L 47/625; G06F 9/45558
See application file for complete search history.

(56) References Cited

U.S. PATENT DOCUMENTS

| | | | | | |
|---|---|---|---|---|---|
| 8,953,611 | B2 * | 2/2015 | Pecen | ................... | H04L 47/624 |
| | | | | | 370/252 |
| 9,088,515 | B2 * | 7/2015 | DeCusatis | ............... | H04L 47/12 |
| 11,997,533 | B2 * | 5/2024 | Mitra | ..................... | H04L 69/326 |
| 12,052,325 | B1 * | 7/2024 | Zhou | ..................... | H04L 67/562 |
| 12,184,417 | B2 * | 12/2024 | Li | ......................... | H04L 1/1671 |
| 2003/0076850 | A1 * | 4/2003 | Jason, Jr. | ................ | H04L 47/36 |
| | | | | | 370/414 |
| 2015/0261556 | A1 * | 9/2015 | Jain | ......................... | H04L 49/70 |
| | | | | | 718/1 |

(Continued)

OTHER PUBLICATIONS

Ben Moshe et al., Pending U.S. Appl. No. 18/224,258, filed Jul. 20, 2023.

(Continued)

*Primary Examiner* — Jason D Cardone
(74) *Attorney, Agent, or Firm* — Alston & Bird LLP

(57) ABSTRACT

Devices, methods, and systems for packet generation for ordered data offloads are provided. The method includes receiving a first transmission request associated with a first message for transmission via a communication network. The first message includes data entries, a first message size defined by the data entries, and a first order by which at least a portion of the data entries are to be executed. The method also includes determining a maximum transport unit (MTU) for a first transport queue associated with the communication network. The first transport queue is associated with packet spreading operations, and the MTU of the first transport queue defines a maximum packet size for packets transmitted via the first transport queue. The method further includes generating first data packet based on the first message having a size that is less than or equal to the MTU for the first transport queue.

20 Claims, 4 Drawing Sheets

300

RECEIVE A FIRST TRANSMISSION REQUEST ASSOCIATED WITH A FIRST MESSAGE FOR TRANSMISSION VIA A COMMUNICATION NETWORK — 302

DETERMINE A MAXIMUM TRANSPORT UNIT (MTU) FOR A FIRST TRANSPORT QUEUE ASSOCIATED WITH THE COMMUNICATION NETWORK — 304

GENERATE AT LEAST A FIRST DATA PACKET BASED ON THE FIRST MESSAGE WHERE A SIZE OF THE GENERATED FIRST DATA PACKET IS LESS THAN OR EQUAL TO A MTU FOR THE FIRST TRANSPORT QUEUE — 306

TRANSMIT THE FIRST DATA PACKET VIA THE FIRST TRANSPORT QUEUE — 308

(56) References Cited

U.S. PATENT DOCUMENTS

| 2016/0057070 | A1* | 2/2016 | Saxena | H04L 47/365 |
| | | | | 370/392 |
| 2019/0215277 | A1* | 7/2019 | Dhanoa | H04L 47/58 |
| 2022/0404980 | A1* | 12/2022 | Brown | G06F 15/17331 |
| 2023/0098349 | A1* | 3/2023 | Mitra | H04L 69/24 |
| | | | | 370/229 |
| 2023/0300728 | A1* | 9/2023 | Kundu | G06F 9/545 |

OTHER PUBLICATIONS

Ben Moshe et al., Pending U.S. Appl. No. 18/224,262, filed Jul. 20, 2023.
Friedman et al., Pending U.S. Appl. No. 18/756,760, filed Jun. 27, 2024.
Arora et al., Pending U.S. Appl. No. 18/758,558, filed Jun. 28, 2024.
Friedman et al., Pending U.S. Appl. No. 18/756,506, filed Jun. 27, 2024.
Shpiner et al., Pending U.S. Appl. No. 18/390,136, filed Dec. 20, 2023.

* cited by examiner

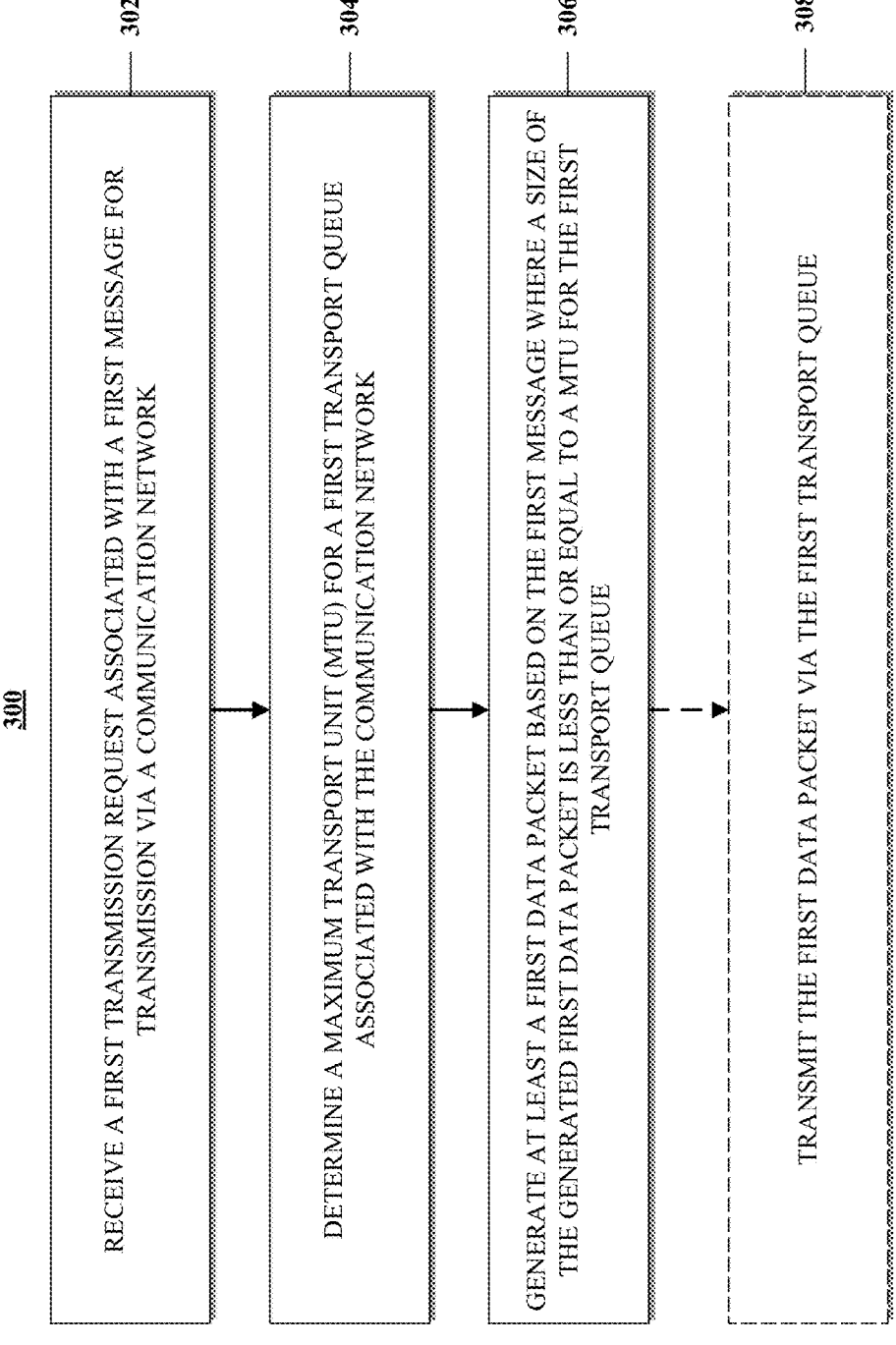

300

302 RECEIVE A FIRST TRANSMISSION REQUEST ASSOCIATED WITH A FIRST MESSAGE FOR TRANSMISSION VIA A COMMUNICATION NETWORK

304 DETERMINE A MAXIMUM TRANSPORT UNIT (MTU) FOR A FIRST TRANSPORT QUEUE ASSOCIATED WITH THE COMMUNICATION NETWORK

306 GENERATE AT LEAST A FIRST DATA PACKET BASED ON THE FIRST MESSAGE WHERE A SIZE OF THE GENERATED FIRST DATA PACKET IS LESS THAN OR EQUAL TO A MTU FOR THE FIRST TRANSPORT QUEUE

308 TRANSMIT THE FIRST DATA PACKET VIA THE FIRST TRANSPORT QUEUE

DETERMINE THAT A MINIMUM PACKET SIZE FOR THE FIRST MESSAGE EXCEEDS THE MTU FOR THE FIRST TRANSPORT QUEUE — 402

GENERATE ONE OR MORE SECOND DATA PACKETS BASED ON THE FIRST MESSAGE FOR TRANSMITTING VIA A SECOND TRANSPORT QUEUE OF THE COMMUNICATION NETWORK — 404

TRANSMIT THE SECOND DATA PACKET VIA THE FIRST TRANSPORT QUEUE — 406

PACKET GENERATION METHODS AND DEVICES FOR ORDERED DATA OFFLOADS

TECHNOLOGICAL FIELD

Embodiments of the present disclosure relate generally to networking and computing systems, and, more particularly, to the generation of packets for ordered data offloads in packet spreading communication networks.

BACKGROUND

Datacenters, high performance computing clusters, and/or other networking applications are often implemented via distributed network components or devices (e.g., hosts, servers, racks, switches, nodes, etc.). Communication networks formed of these components may leverage packet spreading techniques to transmit data to different nodes in the network. Through applied effort, ingenuity, and innovation, many of the problems associated with conventional networking and data transmission have been solved by developing solutions that are included in embodiments of the present disclosure, many examples of which are described in detail herein.

BRIEF SUMMARY

Embodiments of the present disclosure provide for methods, systems, apparatuses, and computer program products for packet generation for ordered data offloads. With reference to an example computer-implemented method, the method may include receiving a first transmission request associated with a first message for transmission via a communication network. The first message may include one or more data entries, a first message size defined at least in part by the one or more data entries and a first order by which at least a portion of the data entries of the first message are to be executed. The method may also include determining a maximum transport unit (MTU) for a first transport queue associated with the communication network. The first transport queue may be associated with packet spreading operations over the communication network and the MTU of the first transport queue may define a maximum packet size for packets transmitted via the first transport queue. The method may further include generating at least a first data packet based on the first message. A size of the generated first data packet may be less than or equal to the MTU for the first transport queue.

In some embodiments, the method may further include transmitting the first data packet via the first transport queue.

In some embodiments, generating the first data packet may include segmenting the data entries of the first message into a plurality of first data packets. At least one of the plurality of first data packets may have a size that is less than or equal to the MTU for the first transport queue.

In some embodiments, the method may further include determining, based on the first message size and/or the first order, that a minimum packet size for the first message exceeds the MTU for the first transport queue.

In some further embodiments, the method may further include generating one or more second data packets based on the first message for transmitting via a second transport queue of the communication network.

In such an embodiment, the packet spreading operations may be unavailable to the second transport queue and/or a MTU for the second transport queue may be greater than the MTU of the first transport queue.

In any embodiment, the portion of the data entries of the first message associated with the first order may be associated with one or more data transformation operations.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described certain example embodiments of the present disclosure in general terms, reference will now be made to the accompanying drawings. The components illustrated in the figures may or may not be present in certain embodiments described herein. Some embodiments may include fewer (or more) components than those shown in the figures.

Figure 1:
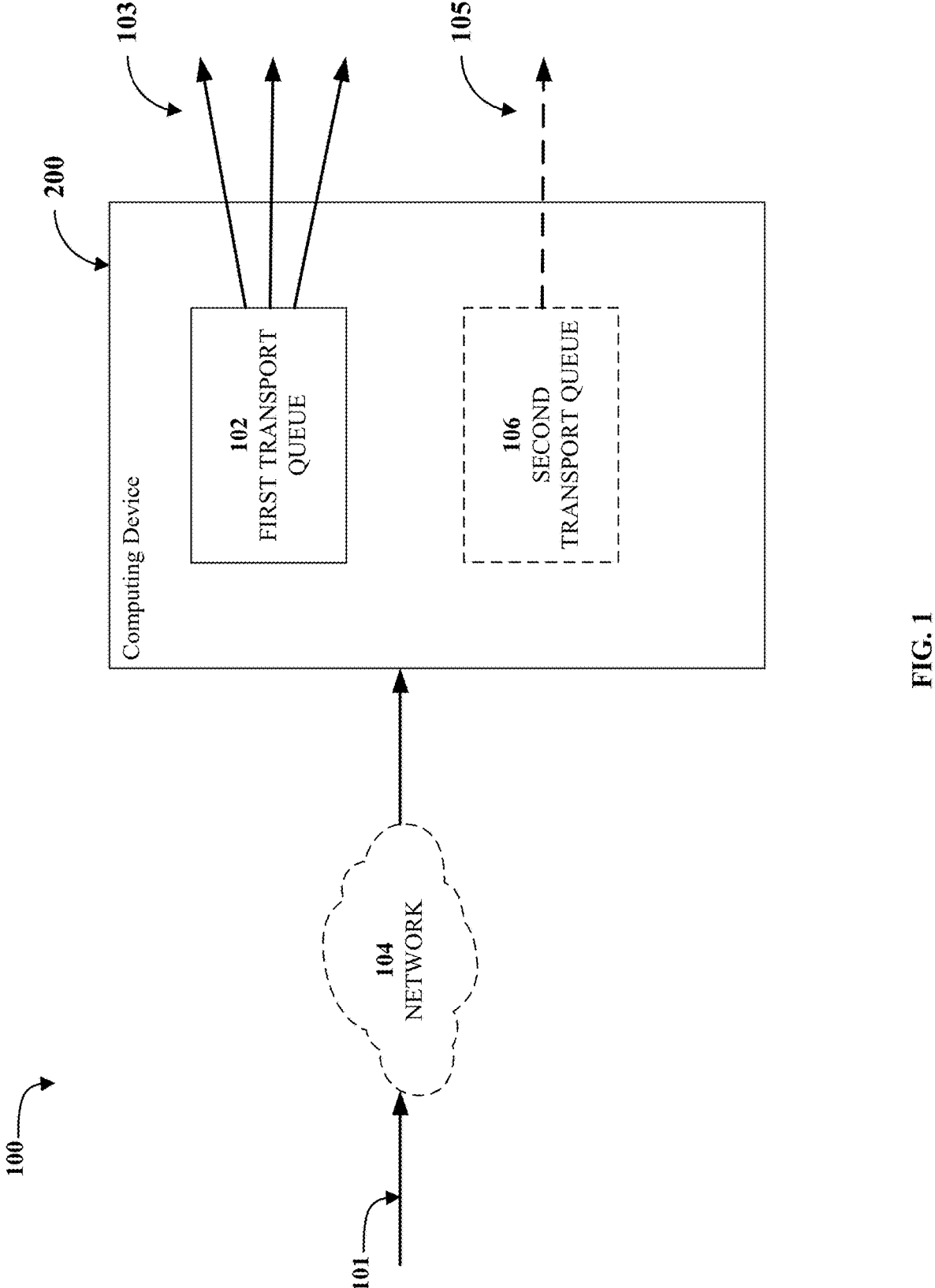
Figure 2:
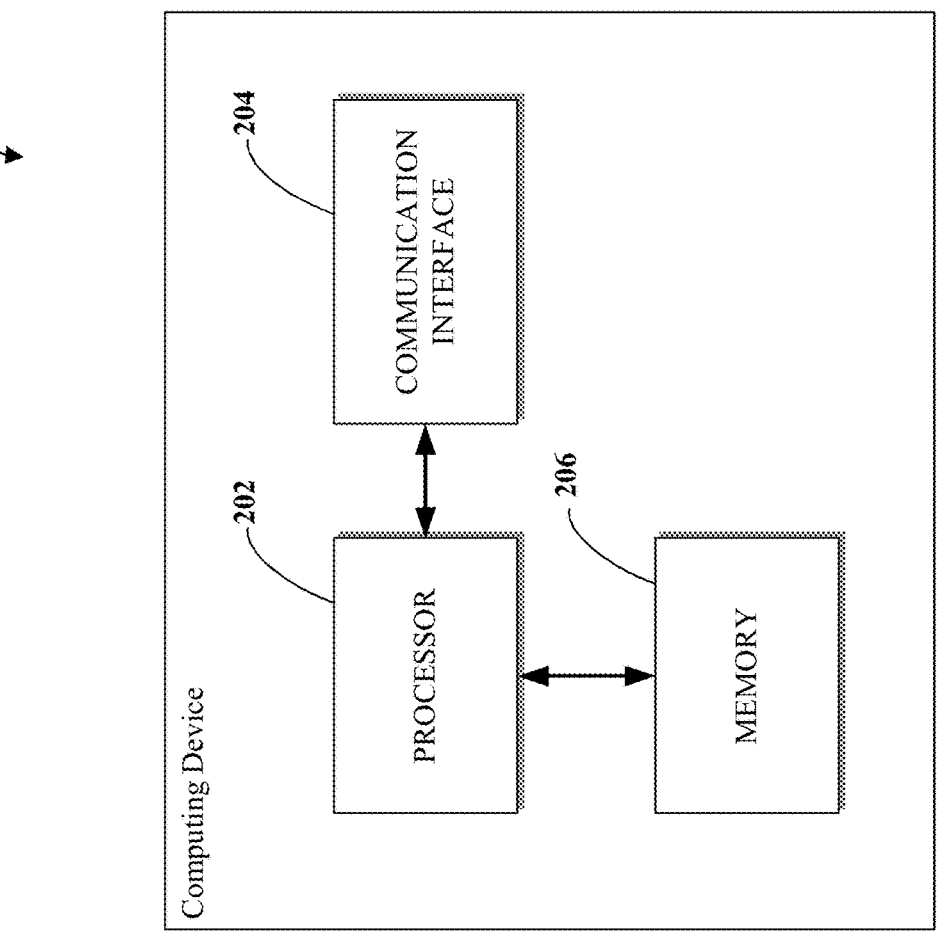
Figure 4:
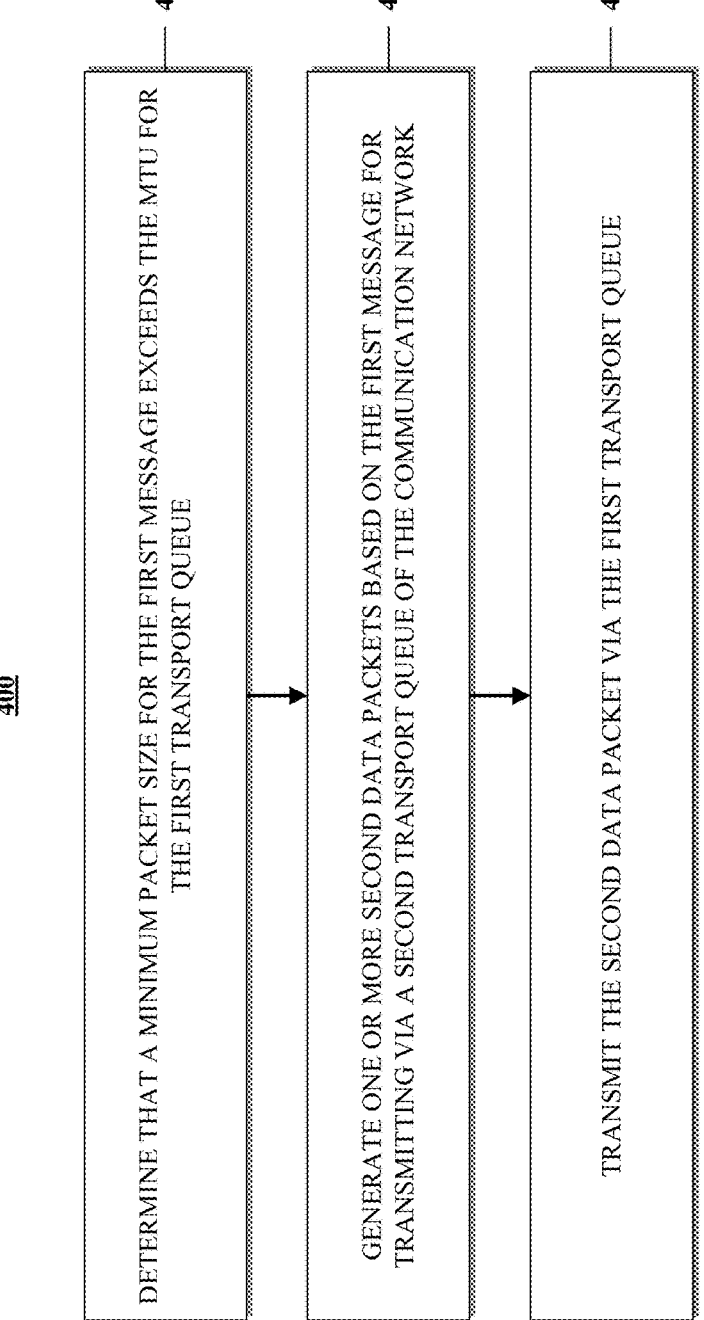

FIG. 1 illustrates an example communication network in accordance with an example embodiment of the present disclosure;

FIG. 2 illustrates a block diagram of example circuitry of a computing device that may be specifically configured in accordance with an example embodiment of the present disclosure;

FIG. 3 illustrates a flowchart of an example method for generating packets for data offloads in packet spreading communication networks in accordance with some embodiments of the present disclosure; and FIG. 4 illustrates another flowchart of an example method for multi-transport queue implementations in accordance with some embodiments of the present disclosure.

DETAILED DESCRIPTION

Overview

Various embodiments of the present disclosure will now be described more fully hereinafter with reference to the accompanying drawings in which some but not all embodiments are shown. Indeed, the present disclosure may be embodied in many different forms and should not be construed as limited to the embodiments set forth herein; rather these embodiments are provided so that this disclosure will satisfy applicable legal requirements. Like reference numerals refer to like elements throughout.

As described above, datacenters, high performance computing clusters, and/or other networking applications are often implemented via distributed network components or devices (e.g., hosts, servers, racks, switches, nodes, etc.). Communication networks formed of these components may generate data packets as a mechanism for effectuating the transmission of messages through the communication network (e.g., between devices, nodes, etc. coupled with the network). For some messages, various data offloads/transformation operations (e.g., encryption operations, signature operations, compression/decompression operations, etc.) may be performed within the network, and these offload operations often require that the data (e.g., data entries of the message) be executed in a defined order. For example, an encryption operation (e.g., an example data offload) may require that the data entries to be encrypted/decrypted be received in a particular order to ensure a successful output (e.g., a successful encryption/decryption).

In some communication networks, packet spreading operations may be employed in which different data paths within the communication network may be used for different data packets in order to optimize network utilization. In packet spreading operations, however, packets associated with the same message may, via transmission by different data paths, arrive at the destination location in an incorrect order (e.g., any order other than the order intended by the initiating device). For packets that are received out-of-order, data offload operations may be ineffective or otherwise produce an incorrect result. Traditional solutions in conventional communication networks rely on either disabling mechanisms for packet spreading or by employing packet reordering buffers at the receiving device. In either traditional solution, network utilization is reduced.

In order to solve these issues and others, the embodiments of the present disclosure provide methods and devices for generating packets for transmission in packet spreading communication networks in which the size of the generated packets are restricted to the maximum transport unit (MTU) for the packing spreading data paths (e.g., a single packet generation). For example, a first transmission request associated with a first message for transmission via a communication network may be received, and the first message may include one or more data entries, a first message size defined at least in part by the one or more data entries, and a first order by which at least a portion of the data entries of the first message are to be executed (e.g., as impacted by data offload operations). A MTU for a first transport queue (e.g., a queue associated with packet spreading) of the communication network is determined where the MTU of the first transport queue defines a maximum packet size for packets transmitted via the first transport queue. At least a first data packet is generated based on the first message where a size of the generated first data packet is less than or equal to the MTU for the first transport queue. In doing so, the generated first data packet (e.g., a single data packet) may ensure that each of the data entries associated with the data offload operation are located within a common data packet (e.g., to prevent out-of-order delivery) while continuing to allow packeting spreading operations to occur on the communication network.

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein as receiving data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein as sending data to another computing device, it will be appreciated that the data may be sent directly to another computing device or may be sent indirectly via one or more intermediary computing devices, such as, for example, one or more servers, relays, routers, network access points, base stations, hosts, and/or the like.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

The terms "illustrative," "exemplary," and "example" as may be used herein are not provided to convey any qualitative assessment, but instead merely to convey an illustration of an example. Thus, use of any such terms should not be taken to limit the spirit and scope of embodiments of the present disclosure. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

Example Communication Network

FIG. 1 illustrates an example communication network (e.g., network 100) for implementing one or more embodiments of the present disclosure. It will be appreciated that the network 100 is provided as an example of an embodiment(s) and should not be construed to narrow the scope or spirit of the disclosure. The network 100 of FIG. 1 may include a computing device 200 communicably coupled within the network 100 for effectuating data transfers between devices within the network (e.g., via network communication protocols 104). For example, the computing device 200 may include components, circuitry, device, etc. configured to receive a first transmission request 101 and generate data packets for transmitting the message associated with the transmission request over the network 100. Although described hereinafter with reference to a computing device 200, the present disclosure contemplates that the operations described hereafter with reference to FIGS. 3-4 may be performed by any server, system orchestrator, central processing unit (CPU), graphics processing unit (GPU), data processing unit (DPU), and/or the like. Furthermore, although illustrated as a single device (e.g., computing device 200), the present disclosure contemplates that any number of distributed components may collectively be used to perform the operations described herein. The computing device 200 may be embodied in an entirely hardware embodiment, an entirely computer program product embodiment, an entirely firmware embodiment (e.g., application-specific integrated circuit, field-programmable gate array, etc.), and/or an embodiment that comprises a combination of computer program products, hardware, and firmware.

As shown in FIG. 1, the communication network 100 may further include at least a first transport queue 102. As described hereinafter, the first transport queue 102 may be associated with packet spreading operations over the communication network 100. To this end, the first transport queue 102 is illustrated in FIG. 1 with a plurality of data transmission paths 103 that may be used for transmitting data packets based on the messages (e.g., first transmission request 101) received by the communication network 100. The first transport queue 102, alone or in conjunction with the computing device 200, may select particular data transmission paths 103 for packet spreading data transmissions so as to optimize utilization of the communication network 100. In some embodiments, the first transport queue 102 may comprise the computing device 200, and/or the computing device 200 may comprise the first transport queue 102. In other embodiments, the first transport queue 102 may be distinct from the computing device 200 and configured to receive instructions from the computing device 200. In any embodiment, the first transport queue 102 may refer to any device, component, data structure, and/or the like for effectuating data transmission over the communication network 100.

With continued reference to FIG. 1, in some embodiments, the communication network 100 may further include a second transport queue 106. As described hereinafter, the second transport queue 106 may not be associated with packet spreading operations over the communication network 100 (e.g., packet spreading may be unavailable or restricted on the second transport queue 106). To this end, the second transport queue 106 is illustrated in FIG. 1 with a single data transmission path 105 that may also be used for transmitting data packets based on the messages (e.g., first transmission request 101) received by the communication network 100. The second transport queue 106, alone or in conjunction with the computing device 200, may operate to provide a data transmission path for messages having a minimum size that exceeds the MTU of the first transport queue 102 as described with reference to FIG. 4. In some embodiments, the second transport queue 106 may comprise the computing device 200, and/or the computing device 200 may comprise the second transport queue 106. In other embodiments, the second transport queue 106 may be distinct from the computing device 200 and configured to receive instructions from the computing device 200. In any embodiment, the second transport queue 106 may also refer to any device, component, data structure, and/or the like for effectuating data transmission over the communication network 100.

To facilitate or otherwise enable this connectivity, the communication network 104 may be any means including hardware, software, devices, or circuitry that is configured to support the transmission of traffic (e.g., data, signals, etc.) between devices forming the network 100. In other words, the communication network 104 of FIG. 1 may refer to the components, devices, transmission protocols, etc. that form or are otherwise leveraged by the communication network 100. For example, the communication network 104 may be formed of components supporting wired transmission protocols, such as, digital subscriber line (DSL), InfiniBand®, Ethernet, fiber distributed data interface (FDDI), or any other wired transmission protocol obvious to a person of ordinary skill in the art. The communication network 104 may also be comprised of components supporting wireless transmission protocols, such as Bluetooth, IEEE 802.11

(Wi-Fi), or other wireless protocols obvious to a person of ordinary skill in the art. In addition, the communication network 104 may be formed of components supporting a standard communication bus, such as, a Peripheral Component Interconnect (PCI), PCI Express (PCIe or PCI-e), PCI eXtended (PCI-X), Accelerated Graphics Port (AGP), or other similar high-speed communication connection. Further, the communication network 104 may be comprised of any combination of the above mentioned protocols.

Example Computing Device Circuitry

With reference to FIG. 2, example circuitry components of the computing device 200 are illustrated that may, alone or in combination with any of the components described herein, be configured to perform the operations described herein with reference to FIGS. 3-4. As shown, the computing device 200 may include, be associated with or be in communication with processor 202, a memory 206, and a communication interface 204. The processor 202 may be in communication with the memory 206 via a bus for passing information among components of the computing device 200. The memory 206 may be non-transitory and may include, for example, one or more volatile and/or non-volatile memories. In other words, for example, the memory 206 may be an electronic storage device (e.g., a computer readable storage medium) comprising gates configured to store data (e.g., bits) that may be retrievable by a machine (e.g., a computing device like the processing circuitry). The memory 206 may be configured to store information, data, content, applications, instructions, or the like for enabling the apparatus to carry out various functions in accordance with an example embodiment of the present disclosure. For example, the memory 206 could be configured to buffer input data for processing by the processor 202. Additionally or alternatively, the memory 206 could be configured to store instructions for execution by the processor 202.

The computing device 200 (e.g., example apparatus of the present disclosure) may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processor 202 may be configured to execute instructions stored in the memory 206 or otherwise accessible to the processor 202. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processor 202 is embodied as an executor of instructions, the instructions may specifically configure the processor to perform the algorithms and/or operations described herein when the instructions are executed. However, in some cases, the processor 202 may be a processor of a specific device configured to employ an embodiment of the present disclosure by further configuration of the processing circuitry by instructions for performing the algorithms and/or operations described herein. The processor 202 may include, among other things, a clock, an arithmetic logic unit (ALU) and logic gates configured to support operation of the processing circuitry.

The communication interface 204 may be any means such as a device or circuitry embodied in either hardware or a combination of hardware and software that is configured to receive and/or transmit data, including media content in the form of video or image files, one or more audio tracks or the like. In this regard, the communication interface 204 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

Example Method for Packet Generation for Ordered Data Offloads

FIG. 3 illustrates a flowchart containing a series of operations for generating packets for data offloads in packet spreading communication networks (e.g., method 300). The operations illustrated in FIG. 3 may, for example, be performed by, with the assistance of, and/or under the control of an apparatus (e.g., computing device 200), as described above. In this regard, performance of the operations may invoke one or more of processor 202, memory 206, and/or communication interface 204.

As shown in operation 302, the apparatus (e.g., computing device 200) includes means, such as communication interface 204, or the like, for receiving a first transmission request 101 associated with a first message for transmission via a communication network 100. As described above, the communication network 100 may be configured to effectuate the transfer of data (e.g., messages, packets, etc.) between devices that are communicably coupled via the communication network 100. The computing device 200 may therefore receive a first transmission request 101 from any transmitting, initiating, etc. device that is communicably coupled with the computing deice 200 via the network. Although described herein with reference to an example first transmission requests and associated first message, the present disclosure contemplates that the embodiments described herein may be applicable to any number of transmission requests and associated messages. As would be evident to one of ordinary skill in the art in light of the present disclosure, the computing device 200 may receive a plurality of transmission requests that are addressed by the computing device 200 (e.g., sequentially, in parallel, etc.) in order to optimize the data transmission by the communication network 100.

The first message associated with the first transmission request 101 received at operation 302 may include one or more data entries and a first message size defined at least in part by the one or more data entries. As described above, the communication network 100 may be configured to transmit data to any number of devices associated with the network 100. As such, the first message of the first transmission request 101 may include one or more data entries that form the first message and are to be transmitted, via the communication network 100, to one or more destination locations, devices, write locations, and/or the like. The present disclosure contemplates that the first message may include any number of data entries of any type, configuration, format, etc. based on the intended operations of the transmitting device (not shown), the communication network 100, etc. The first message of the first transmission request 101 may further be associated with a first message size that is at least partially impacted by the one or more data entries of the first message. By way of example, the number of data entries associated with the first message may impact the first message size (e.g., a larger number of data entries may increase the first message size). By way of an additional example, the size (e.g., in bits, bytes, etc.) of the one or more data entries of the first message may impact the first message size.

The first message may further include or otherwise define a first order by which at least a portion of the data entries of the first message are to be executed. As described above, various data offloads operations (e.g., encryption, signature operations, etc.) may be performed within the network 100, and these offload operations often require that the data (e.g., data entries of the first message) be executed in a defined order. For example, an encryption operation (e.g., an example data offload or transformation operation) may require that the data entries to be encrypted/decrypted be received in a particular order to ensure a successful output (e.g., a successful encryption/decryption). As such, the portion of the data entries of the first message (e.g., of first transmission request 101) associated with the first order may further be associated with one or more data transformation operations (e.g., data encryption, signatures operations, etc.). As described hereafter, the portion of the data entries of the first message that are associated with the first order may be required to be contained within the same packet for transmission to ensure that the data offload/transformation operations may be completed successfully.

Thereafter, as shown in operation 304, the apparatus (e.g., computing device 200) includes means, such as processor 202, or the like, for determining a maximum transport unit (MTU) for the first transport queue 102 associated with the communication network 100. As described above, the first transport queue 102 may be associated with packet spreading operations over the communication network 100. For example, the first transport queue 102 may include a plurality of data transmission paths 103 that may be used for transmitting data packets based on the first messages (e.g., first transmission request 101) received by the communication network 100. The first transport queue 102, alone or in conjunction with the computing device 200, may select particular data transmission paths 103 for packeting spreading data transmissions so as to optimize utilization of the communication network 100.

The first transport queue 102 may further define a MTU that represents the maximum packet size for packets transmitted via the first transport queue 102. In order to prevent the separation of data entries of the first message that are associated with the first order (e.g., and therefore must be received in a defined order for successful data transformation/offload operations to occur) from being transmitted via different packets, the MTU for the first transport queue 102 may be exposed to the transmitting devices of the communication network 100. The determination of the MTU for the first transport queue 102 at operation 304 may, in some embodiments, refer to the determination of the MTU by the computing device 200, such as in response to a query from the computing device 200 to the first transport queue 102 requesting the associated MTU. In other embodiments, such as in instances in which the computing device 200 comprises the first transport queue 102, the determination at operation 304 may refer to the computing device 200 providing the MTU for the first transport queue to device (e.g., transmitting and/or receive devices) of the communication network 100.

Thereafter, as shown in operation 306, the apparatus (e.g., computing device 200) includes means, such as processor 202, or the like, for generating at least a first data packet based on the first message. As described above, at least a portion of the data entries forming the first message may be associated with a data offload/transformation operation (e.g., encryption, signature operations, etc.) such that the first order for this portion of data entries defines an order in which these data entries are to be executed. In order to ensure that the data entries that are associated with the first order remain in the same data packet, a size of the generated first data packet may be less than or equal to the MTU for the first transport queue 102. In this way, the first transport queue 102 may continue to provide packet spreading operations via data transmission paths 103 without compromising the first order. In other words, the data entries of the first message that must be received at the same time (e.g., not out-of-order) are contained within a single data packet (e.g., the first data packet) generated at operation 306. As described above, the first message size for the first message may be impacted by the number of data entries, the size of the data entries, etc. The generation of the first data packet at operation 306 may account for the first message size for the first message in ensuring that the size of the generated first data packet is less than or equal to the MTU for the first transport queue 102. Although described herein with reference to a single first data packet, the present disclosure contemplates that any number of data packets may be generated based on the first message so long as the data entries associated with the first order are contained within the same data packet.

Thereafter, as shown in operation 308, the apparatus (e.g., computing device 200) includes means, such as communications interface 204, or the like, for transmitting the first data packet via the first transport queue 102. As described above, the first transport queue 102 is associated with packet spreading operations such that the first data packet generated at operation 306 may be transmitted via one of the data transmission paths 103 for the first transport queue 102. To the extent that the computing device 200 generates additional first data packets, such as data packets that are associated with the first message but not associated with data offloads/transformation operations, the computing device 200 may transmit these additional first data packets via the first transport queue 102 as well. In an instance in which the minimum packet size for the first message exceeds the MTU for the first transport queue 102, the operations of FIG. 4 may be used.

FIG. 4 illustrates a flowchart containing a series of operations for multi-transport queue implementations (e.g., method 400). The operations illustrated in FIG. 4 may, for example, be performed by, with the assistance of, and/or under the control of an apparatus (e.g., computing device 200), as described above. In this regard, performance of the operations may invoke one or more of processor 202, memory 206, and/or communication interface 204.

As shown in operation 402, the apparatus (e.g., computing device 200) includes means, such as processor 202, or the like, for determining, based on the first message size and/or the first order, that a minimum packet size for the first message exceeds the MTU for the first transport queue 102. As described above, the first message may further include or otherwise define a first order by which at least a portion of the data entries of the first message are to be executed. For example, various data offloads operations (e.g., encryption, signature operations, etc.) may be performed within the network 100, and these offload operations often require that the data (e.g., data entries of the first message) be executed in a defined order. As such, the portion of the data entries of the first message that are associated with the first order may be required to be contained within the same packet for transmission to ensure that the data offload operations may be completed successfully.

In some embodiments, however, the size (e.g., number of data entries, size of data entries, etc.) for a packet that includes each of the data entries of the first message that are associated with the first order may exceed the MTU for the first transport queue 102. Said differently, the minimum packet size for the first message exceeds the MTU for the first transport queue. In such an embodiment, the first transport queue 102 may be incapable of ensure that the data entries associated with the first order are received at the destination location in the correct order due to the packet spreading capabilities (e.g., the plurality of data transmission paths 103) for the first transport queue 102. In order to address these instances, in some embodiments, the network 100 may include a second transport queue 106 for which packet spreading operations are unavailable or otherwise restricted. Although illustrated in FIG. 1 with a single data transmission path 105, the present disclosure contemplates that the second transport queue 106 may be capable of packet spreading operations; however, these operations (e.g., via instructions from the computing device 200 or the like) may be restricted. Additionally or alternatively, in such an instance, a MTU for the second transport queue 106 may be greater than the MTU of the first transport queue 102 so as to accommodate the minimum packet size for the first message.

Thereafter, as shown in operation 404, the apparatus (e.g., computing device 200) includes means, such as processor 202, or the like, for generating one or more second data packets based on the first message for transmitting via a second transport queue of the communication network. The generation of the second packets may occur substantially the same as described above with reference to operation 306 in FIG. 3 but may be sized with consideration for the MTU requirements for the second transport queue 106. The present disclosure contemplates that any number of second data packets may be generated based on the intended application of the computing device 200, the network 100, and/or the like. Furthermore, the present disclosure contemplates that, in some embodiments, a portion of the data entries of the first message may be transmitted by the first transport queue 102 while another portion of the data entries of the first message may be transmitted by the second transport queue 106. Thereafter, as shown in operation 406, the apparatus (e.g., computing device 200) includes means, such as communications interface 204, or the like, for transmitting the second data packet(s) via the second transport queue 106.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to a network interface environment, however, one skilled in the art may recognize that such principles may be applied to any scheduler receiving commands and/or transactions and having access to two or more processing cores. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A computer-implemented method comprising:
receiving a first transmission request associated with a first message for transmission via a communication network, wherein the first message comprises:
one or more data entries;
a first message size defined at least in part by the one or more data entries; and
a first order by which at least a portion of the data entries of the first message are to be executed;
determining a maximum transport unit (MTU) for a first transport queue associated with the communication network, wherein:
the first transport queue is associated with packet spreading operations over the communication network such that at least a portion of data entries forming data packets that are sent via the first transport queue are transmitted to different nodes of the communication network; and
the MTU of the first transport queue defines a maximum packet size for packets transmitted via the first transport queue; and
generating at least a first data packet based on the first message, wherein a size of the generated first data packet is less than or equal to the MTU for the first transport queue.

2. The computer-implemented method according to claim 1, further comprising determining, based on the first message size and/or the first order, that a minimum packet size for the first message exceeds the MTU for the first transport queue.

3. The computer-implemented method according to claim 2, further comprising generating one or more second data packets based on the first message for transmitting via a second transport queue of the communication network that is independent of the first transport queue.

4. The computer-implemented method according to claim 3, wherein packet spreading operations are unavailable to the second transport queue.

5. The computer-implemented method according to claim 3, wherein a MTU for the second transport queue is greater than the MTU of the first transport queue.

6. The computer-implemented method according to claim 1, further comprising transmitting the first data packet via the first transport queue.

7. The computer-implemented method according to claim 1, wherein the portion of the data entries of the first message associated with the first order are associated with one or more data encryption operations.

8. A computing device comprising:
a non-transitory storage device; and
a processor coupled to the non-transitory storage device, wherein the processor is configured to:
receive a first transmission request associated with a first message for transmission via a communication network, wherein the first message comprises:

one or more data entries;

a first message size defined at least in part by the one or more data entries; and a first order by which at least a portion of the data entries of the first message are to be executed;

determine a maximum transport unit (MTU) for a first transport queue associated with the communication network, wherein:

the first transport queue is associated with packet spreading operations over the communication network such that at least a portion of data entries forming data packets that are sent via the first transport queue are transmitted to different nodes of the communication network; and the MTU of the first transport queue defines a maximum packet size for packets transmitted via the first transport queue; and generate at least a first data packet based on the first message, wherein a size of the generated first data packet is less than or equal to the MTU for the first transport queue.

9. The computing device according to claim 8, wherein the processor is further configured to determine, based on the first message size and/or the first order, that a minimum packet size for the first message exceeds the MTU for the first transport queue.

10. The computing device according to claim 9, wherein the processor is further configured to generate one or more second data packets based on the first message for transmitting via a second transport queue of the communication network that is independent of the first transport queue.

11. The computing device according to claim 10, wherein packet spreading operations are unavailable to the second transport queue.

12. The computing device according to claim 10, wherein a MTU for the second transport queue is greater than the MTU of the first transport queue.

13. The computing device according to claim 8, wherein the processor is further configured to cause transmission of the first data packet via the first transport queue.

14. The computing device according to claim 8, wherein the portion of the data entries of the first message associated with the first order are associated with one or more data encryption operations.

15. A computer program product comprising at least one non-transitory computer-readable storage medium having computer program code thereon that, in execution with at least one processor, configures the computer program product for:

receiving a first transmission request associated with a first message for transmission via a communication network, wherein the first message comprises:

one or more data entries;

a first message size defined at least in part by the one or more data entries; and a first order by which at least a portion of the data entries of the first message are to be executed;

determining a maximum transport unit (MTU) for a first transport queue associated with the communication network, wherein:

the first transport queue is associated with packet spreading operations over the communication network such that at least a portion of data entries forming data packets that are sent via the first transport queue are transmitted to different nodes of the communication network; and the MTU of the first transport queue defines a maximum packet size for packets transmitted via the first transport queue; and generating at least a first data packet based on the first message, wherein a size of the generated first data packet is less than or equal to the MTU for the first transport queue.

16. The computer program product according to claim 15, further configured for determining, based on the first message size and/or the first order, that a minimum packet size for the first message exceeds the MTU for the first transport queue.

17. The computer program product according to claim 16, further configured for generating one or more second data packets based on the first message for transmitting via a second transport queue of the communication network that is independent of the first transport queue.

18. The computer program product according to claim 17, wherein packet spreading operations are unavailable to the second transport queue.

19. The computer program product according to claim 17, wherein a MTU for the second transport queue is greater than the MTU of the first transport queue.

20. The computer program product according to claim 15, further configured for transmitting the first data packet via the first transport queue.

* * * * *